United States Patent Office 3,256,265
Patented June 14, 1966

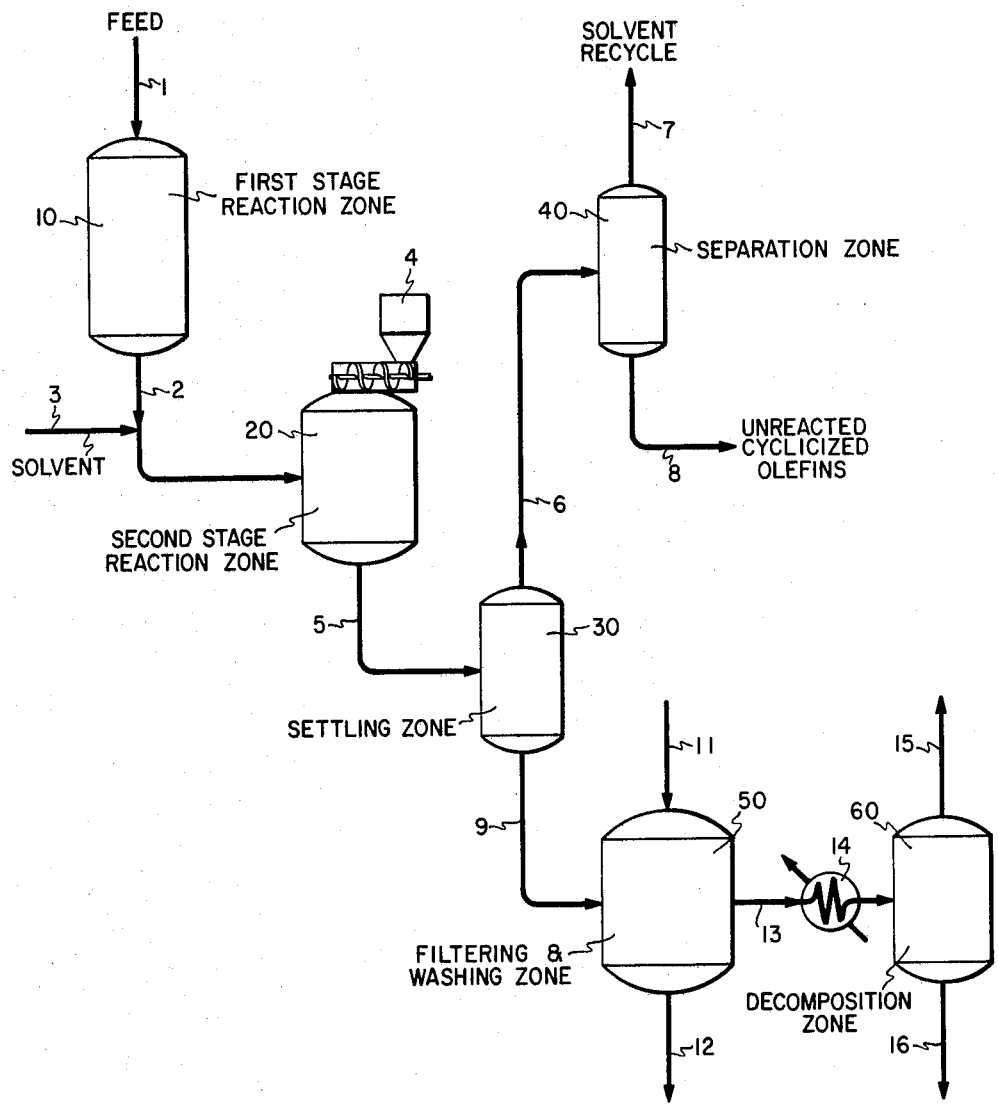

3,256,265
OLEFIN PURIFICATION PROCESS
Robert P. Cahn, Millburn, N.J., and William Henry Jones, Baton Rouge, La., assignors to Esso Research and Engineering Company, a corporation of Delaware
Filed Aug. 7, 1963, Ser. No. 300,455
6 Claims. (Cl. 260—96.5)

This invention relates to a process for the treatment of straight chain olefins and refers more particularly to a treatment for refining straight chain olefins produced by the thermal cracking of relatively straight chain hydrocarbons, so as to substantially reduce the percentage of objectionable constituents such as branched and cyclic mono-olefins, dienes, and aromatics contained therein.

It is well known in the art to separate hydrocarbon fractions and particularly hydrocarbon constituents from each other by the use of various operations. Such operations comprise, for example, distillation operations, solvent extraction operations, solid adsorption operations, extractive distillation operations, and the like. The separation of hydrocarbon mixtures using such operations presents numerous problems, however, both technical and economic. This is particularly true in the case of hydrocarbon mixtures containing compounds which have relatively close boiling points and which are relatively closely related in a chemical sense. Heretofore, the two principal means utilized for separation of such mixtures on a commercial scale have been by fractional distillation and by solvent extraction, or by combination of the two, such as in azeotropic and extractive distillations. Recently it has also been suggested to use urea as a chemical reagent for the separation of certain hydrocarbons. Urea separation processes depended upon the interaction of urea and certain types of hydrocarbons, principally the straight chain compounds, to form solid-crystalline, urea-hydrocarbon complexes. While these urea treatments will effect a more or less extensive removal of some of the undesired non-linear and cyclic mono-olefins, as well as aromatics, which contaminate the desirable straight chain olefins, they are disappointing in the effective removal of relatively straight chain dienes which contaminate olefins produced by high temperature thermal cracking.

For example, straight chain olefins produced by steam cracking of such feed stocks as wax or petrolatum will be contaminated by all of the above impurities. Thus economical purification of these petrolatum olefins has been a major problem of some long standing.

One object of this invention, therefore, is a process to obtain "ultrapure" olefins, that is, linear alpha olefins of greater than 95 percent purity which have been isolated from crude steam-cracked olefins. This and still further objects will become apparent from the following description.

In broad term, the present invention relates to a process for the selective, catalytic conversion of nonconjugated dienes contained in linear olefins produced by the thermal cracking, such as steam cracking, of hydrocarbons, under conditions such that said dienes are converted to cyclic mono-olefins. In accordance with the invention, this cyclization reaction is coupled with and followed by a urea adduction process whereby the desired "ultrapure" olefins are obtained. Thus the present invention provides a practical means for upgrading crude, steam-cracked olefins to 95 percent plus purity by converting the diolefinic impurities contained therein to cyclic mono-olefins by free radical reaction, thermally or in the presence of a nonacidic catalyst such as silica gel, activated carbon and the like, followed by rejection of all nonlinear contaminants by urea adduction.

In general, the process of the present invention is applicable to any straight-chain olefin containing undesirable impurities such as dienes, both conjugated and unconjugated, aromatics, and nonlinear mono-olefins. The process is particularly applicable to those olefins obtained by the thermal or catalytic cracking of hydrocarbon feed stock such as that produced in the refining of crude petroleum oils. Particularly preferred olefins are those commonly known as wax-cracked olefins, which are produced by steam cracking of relatively straight chain hydrocarbon feeds such as wax or petrolatum. Other preferred olefins are those known as cracked raffinate olefins which are obtained from the cracking of the raffinate obtained by the selective solvent extraction of heavy catalytically cracked cycle oil. Both wax-cracked olefins and cracked raffinate olefins can be fractionally distilled to obtain individual olefins having at least 6 and up to about 20 carbon atoms in the molecule.

Further olefins which are suitable in the present invention are those produced by the catalytic dehydrogenation of relatively straight chain paraffin feeds, especially dehydrogenations carried out in the presence of halogen or halogen compounds and oxygen.

The process of the present invention is applicable not only to olefins having the same number of carbon atoms in the molecule, but is also suitable for mixtures of such olefins, for example, mixtures of $C_6$-$C_{20}$, $C_{10}$-$C_{15}$ olefins, and the like. Particularly preferred mixtures of olefins are the $C_{10}$-$C_{15}$ wax-cracked olefins, which are especially useful in the manufacture of biodegradable detergents.

According to the present invention, the olefin or mixture of olefins is treated in a first stage by a selective conversion of the nonconjugated dienes present therein to cyclic mono-olefins. This cyclization is believed to occur through a free radical reaction of the following type:

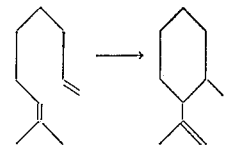

The preferred method of carrying out the first stage of the purification process is generally in a continuous operation with a stream of the olefin being passed or percolated through a fixed bed of nonacidic catalyst, preferably activated silica gel in a first stage reaction chamber. This first stage is best carried out at ambient or somewhat elevated temperatures. The reaction chamber, therefore, is maintained at a temperature between 50 and 600° F., preferably between 50 and 150° F. The pressures in this first stage are maintained at atmospheric to 500 p.s.i.g. and preferably atmospheric to 100 p.s.i.g. The flow rate of olefin which passes through the first reaction stage has a space velocity of from 0.005 to 1.0 v./v./hr. and preferably 0.01 to 0.5 v./v./hr. While the time for complete percolation through the particles of silica gel catalyst is generally from 6 to 14 hours, including elution time, it has been found that relatively longer contact times produced a pronounced effect on the cyclization of the diolefin content Thus, time periods of from 24 to 100 hours at ambient temperature are preferred. Shorter times, however, may be applied at relatively higher temperatures, i.e., 150 to 250° F.

It has been found that upwards of 70 percent of the nonconjugated diene impurities are converted to cyclic mono-olefinic impurities in the first stage of the present invention. Further it has been found that generally no polymerization or isomerization of mono-olefins occurs, and yields approximating quantitative are obtained.

In accordance with the present invention, the olefin feed stream is subsequently treated in a second stage by treatment with urea by adding urea to the olefin feed to form an adduct from which the purified olefin final product is obtained. One such processing sequence is described below. However, many other ways of separating straight-chain hydrocarbons from nonlinear hydrocarbons by urea adduction are well known in the art, such as disclosed in L. Salzmann, U.S. Patent 2,731,455 and A. Hoppe, et al., U.S. Patent 3,071,534. In the urea adduction stage, it is essential to employ a suitable solvent. The solvent may be one in which both urea and the olefin to be segregated are soluble. Suitable solvents are the lower alcohols, halogenated hydrocarbons, the alcohol amines, and the nitriles. Preferably, the urea is added to the olefin in alcoholic or aqueous solution. Specific solvents are, for example, the monohydric alcohols: methyl alcohol, ethyl alcohol, the propyl alcohols, the butyl alcohols, the amyl alcohols, and the like. The preferred alcohols are methyl alcohol and isopropyl alcohol. Alternatively polyhydric alcohols such as ethylene glycol or propylene glycol can be employed. Suitable alcohol amines are ethanol amine, propanol amine, diethanol amine, and the like, while suitable nitriles are acetonitrile, propyl nitrile, butyl nitrile, and the like. A suitable halogenated hydrocarbon is methylene chloride. Of these solvents, the preferred solvents are methyl alcohol and methylene chloride. In addition, the introduction of the urea can be carried out in the presence of a diluent such as a light isoparaffin, which does not readily form a crystalline complex with urea under the reaction conditions. The presence of a diluent results in a filterable slurry of the adduct in the diluent rather than a substantially solid mass of adduct.

The temperatures employed in the second stage of the present invention are somewhat critical. Thus, while temperatures of from about 15° F. up to about 130° F. can be employed, it is found that more desirable results are obtained if relatively low temperatures, i.e., 70–100° F. are employed in the treatment of the olefin, providing the volume of solvent employed is controlled within critical limits. Thus, it is also extremely preferable to employ less than one mole of solvent per mole of urea.

The process of the present invention may be readily understood by referring to the drawing illustrating one embodiment of the invention. Referring specifically to the drawing, a crude olefin feed stream, which for the purpose of illustration is assumed to contain linear, branched and cyclic mono-olefins, dienes and aromatics, is introduced into the first stage reaction zone 10 by means of feed line 1. The crude olefin feed is percolated through granulated silica gel contained in the column which comprises reaction zone 10. For the purposes of illustration, the following data illustrate a typical change in olefin composition after an 80-hour contact time with $SiO_2$ at ambient temperatures:

| Composition, Wt. percent | Feed | Product |
| --- | --- | --- |
| Acyclic Mono-olefins | 75.6 | 75.6 |
| Cyclic Mono-olefins | 6.7 | 13.7 |
| Dienes | 10.0 | 3.0 |
| Aromatics | 7.0 | 7.0 |
| Saturates | 0.7 | 0.7 |
| Type I Olefins [1] | 97.8 | 96.2 |

[1] In mono-olefin fraction.

After the above cyclization step, the olefin feed is introduced into the second reaction zone 20 by means of feed line 2. The solvent utilized, such as, for example, methanol, is introduced through line 3 for admixture with the olefin stream in line 2. It is preferable that a relatively small amount of solvent is employed, which is generally less than 5 percent by volume based upon the olefin stream. The urea employed is introduced to reaction zone 20 by suitable means, such as from hopper 4 by the screw conveyor illustrated. Also, a non-complexing diluent is preferably added at this point, such as isopentane, in a 1/1 vol. ratio to the feed.

Reaction zone 20 is maintained at a temperature suitable for adduct formation, i.e., below about 130° F. and is preferably maintained at a temperature of about 70–100° F. After sufficient time has been permitted for the reactants to reach an equilibrium in reaction zone 20, the reactants and reaction products are withdrawn through line 5 and passed to settling zone 30. In settling zone 30, essentially a two-phase system separates, the lower phase comprising crystals of urea, e.g., linear aliphatic olefin complex plus any unreacted urea crystals and urea alcohol complex, and the upper phase will comprise the olefins which have not reacted with urea, that is, the cyclized olefins present and the non-complexing diluent. To secure separation of these crystals, a centrifuge may be used or a continuous settler such as a Dorr thickener.

The liquid phase, comprising primarily unreacted cyclic olefins, is withdrawn from zone 30 by means of line 6 and is introduced into separation zone 40 wherein any solvent remaining in the hydrocarbon may be removed by distillation or water washing or by use of solid absorbents, etc. The solvent which is recovered is preferably recycled to the system by means of line 7, while the unreacted cyclized olefins are removed from zone 40 by means of line 8 and may be handled as desired.

In accordance with one modification of the present invention, the cyclized olefin stream of line 6 may be further contacted with urea prior to removal of solvent from the stream to secure further segregation in a manner similar to that described with respect to the feed stream introduced by means of line 2. This essentially provides a three-stage treatment which may be conducted to secure a more selective fractionation of normal aliphatic olefins than heretofore contemplated.

Urea complexes formed in zone 20 are withdrawn from settling zone 30 by means of line 9 and are passed to filtering and washing zone 50. In this zone the urea complex is washed with an inert diluent, such as isopentane which is introduced by means of line 11 and withdrawn by means of line 12. If desired, a small amount of the solvent employed in zone 20, particularly if saturated with urea, may be used as the wash liquid. The urea complex is withdrawn from zone 50 by means of line 13 and is introduced into decomposition zone 60.

The decomposition of urea-linear aliphatic olefin complexes may be achieved by washing the crystals with water or any urea solvent or hydrocarbon solvent if desired. However, it is preferred not to use a solvent for this purpose as it is generally simpler to heat the crystals in zone 60. It is only necessary that the crystals introduced into zone 60 be subjected to temperatures of about 100° F. to 200° F., and preferably 130 to 170° F. For this purpose, hot gases may be used, heat exchanger 14 may be employed, or the substantially dry crystals may be stirred in zone 60 so as to be exposed to radiant heat from the walls of the zone. The linear olefins released from the urea-olefin complexes may be removed from the decomposition zone as a separate liquid phase, or they may be distilled overhead by decreasing the pressure or increasing the temperature of this zone. Thus, the linear olefins obtained by the decomposition of the urea complexes may be withdrawn overhead from zone 60 by means of line 15 and may be further treated as desired while the urea crystals are withdrawn from zone 60 by means of line 16 and are recycled to zone 20.

At present, the greatest potential use of the purified olefins, especially those in the $C_{10}$–$C_{15}$ range, resulting from the process of the present invention is in the manufacture of linear detergent alkylates. Other uses include the conversion of narrow fractions of olefins, such as $C_8$ olefins, to plasticizers and other specialty products. Thus, an apparent advantage of the instant invention is the substantially complete removal of impurities, such as aromatics and dienes which are particularly undesirable, with reference to the foregoing, because they increase catalyst consumption in the alkylation step and lower detergent alkylate yields. Further advantage resides in the removal of branched chain olefins which are objectionable, inasmuch as they reduce the biodegradability of the final product.

The process of the present invention may be further understood by the following examples illustrating embodiments of the same.

EXAMPLE I

A crude steam cracked olefin mixture having the composition set forth below was percolated through a nine foot column of 100–200 mesh grade 923 silica gel. The percolation time was 80 hours and the temperature employed was ambient, i.e., about 70° F. The composition of the resulting cyclized product is set forth in the table below. Such cyclized product is then subjected to urea adduction utilizing 0.5 gal. of methyl (alcohol) per pound of cyclized olefin feed and 4 pounds of urea per pound of cyclized olefin feed at 80° F., followed by mechanical agitation to attain equilibrium.

The results of these operations are listed in the following table.

TABLE I

| | Feed | $SiO_2$ Gel Cyclized Product | Urea Adduction | |
|---|---|---|---|---|
| | | | Purified Product | Raffinate |
| Yield, Wt. Percent on Crude $C_{10}$–$C_{15}$ Olefin Smear | | 100 | 64.7 | 35.3 |
| Composition, Wt. Percent: | | | | |
| Mono-olefins | 84.5 | 91.9 | 95.9 | 85.2 |
| Linear | 65.1 | 65.1 | 95.5 | 9.3 |
| Branched | 9.4 | 9.4 | Trace | 26.6 |
| Cyclic | 10.0 | 17.4 | Trace | 49.3 |
| Dienes | 10.5 | 3.1 | 4.5 | 0.6 |
| Aromatics | 5.0 | 5.0 | Trace | 14.2 |

From the above, it is apparent that "ultrapure" linear olefins, i.e., greater than 95% purity, can be produced by silica gel cyclization of diene followed by urear adduction.

This two-stage purification technique thus affords better product quality than urea adduction alone, because the latter does not reject linear dienes.

EXAMPLE II

In order to illustrate the criticality of the order of the steps employed, a crude steam-cracked olefin mixture similar to that employed in Example I above can be subjected to the same steps as those used in Example I with the exception that the order is reversed. The data resulting from such reversal of steps is as set forth in the following table.

TABLE II

| | Feed | Urea Adducted Product | | $SiO_2$ Gel Cyclized Product | |
|---|---|---|---|---|---|
| Yield, Wt. Percent on Feed | | 67 | | 67 | |
| | | Lb./100 lb. Feed | Wt. Percent | Lb./100 lb. Feed | Wt. Percent |
| Composition, Wt. Percent: | | | | | |
| Mono-olefins | 84.5 | 61.3 | 91.5 | 61.3 | 91.5 |
| Linear | 65.1 | 61.3 | 91.5 | 61.3 | 91.5 |
| Branched | 9.4 | Trace | Trace | Trace | Trace |
| Cyclic | 10.0 | Trace | Trace | 4.0 | 6.0 |
| Dienes | 10.5 | 5.7 | 8.5 | 1.7 | 2.5 |
| Aromatics | 5.0 | Trace | Trace | Trace | Trace |

From the above, it can be seen that while the urea adduction step removes most of the cylic mono-olefins present in the feed, little of the dienes contained therein are removed. It is apparent too, that upon silica gel contact such dienes are then cyclized to highly undesirable cyclic mono-olefins, thus restoring said cyclics to a level approaching that of the initial untreated feed.

EXAMPLE III

Other operations were conducted wherein silica gel contact times were varied and the change of the diolefin content was determined. Compared below are results from three analytical percolation runs at ambient temperatures on a $C_{10}$ to $C_{15}$ fraction of cracked petrolatum using a 9-foot column of 100–200 mesh grade 923 silica gel, where the main differences in these runs was time of contact.

TABLE III

| | Run 1 | Run 2 | Run 3 |
|---|---|---|---|
| Percolation Time, Hours | 12 | 14 | 80 |
| Material Balance, Percent | 99.1 | 98.7 | 100.0 |
| Analyses, Wt. Percent: | | | |
| Paraffins | 0.4 | 0.7 | 0.7 |
| Aromatics | 5.0 | 7.0 | 7.0 |
| Mono-olefins | 83.6 | 82.3 | 89.3 |
| Diolefins | 11.0 | 10.0 | 3.0 |
| $C_nH_{2n-2}$[a] on Narrow Fractions of Mono-olefin Percolated— | | | |
| At 14% Percolated | 4.1 | | 7.2 |
| At 44% Percolated | 6.7 | | 13.7 |
| At 79% Percolated | 11.0 | | 15.1 |

[a] Cyclic mono-olefins by mass spectrometer and bromine number analyses. The remaining compounds were aliphatic mono-olefins ($C_nH_{2n}$).

The above shows that the diolefin content was considerably lower (3.0% vs. 10 to 11%) for the 80 hours contact than for the 12 to 14 hours contact. Moreover, mass spectrometer analyses on the comparable narrow fractions of the mono-olefin percolate show considerably higher cyclic mono-olefins ($C_nH_{2n-2}$) for Run 3 (7, 14 and 15%) as compared to Run 1 (4, 7 and 11%). It is thus apparent that the diolefins were converted primarily into cyclic mono-olefins.

What is claimed is:

1. A process of separating linear aliphatic olefins from a mixture thereof with non-conjugated diolefins which comprises the steps of contacting the mixture with silica gel at temperatures of from about 50° F. to 150° F. thereby converting at least a portion of the non-conjugated diolefins contained in the mixture to cyclized mono-olefins of the same number of carbon atoms, treating the resulting cyclized mixture with urea thereby producing a solid complex of said linear olefins and urea, separating said solid complex from the remaining cyclized mixture and decomposing said complex to produce linear aliphatic olefins of 95+% purity.

2. A process of separating linear aliphatic olefins from a wax cracked olefin mixture containing therewith branched and cyclic mono-olefins, non-conjugated diolefins, and aromatics which comprises the steps of passing the mixture through a fixed bed of granular silica gel at temperatures of from about 50° F. to 150° F. thereby converting at least a portion of the non-conjugated diolefins contained in the mixture to cyclized mono-olefins of the same number of carbon atoms, treating the resulting cyclized mixture with urea thereby producing a solid complex of said linear olefins and urea, separating said solid complex from the remaining cyclized mixture and decomposing said complex to produce linear aliphatic olefins of 95+% purity.

3. The process of claim 2, in which less than one mole of solvent per mole of urea is employed.

4. A process of separating linear aliphatic olefins from a mixture thereof with branched and cyclic mono-olefins, non-conjugated diolefins and aromatics which comprises the steps of contacting the mixture with silica gel at a temperature of from 50 to 150° F. thereby converting at least a portion of the non-conjugated diolefins contained in the mixture to cyclized mono-olefins of the same number of carbon atoms, treating the resulting cyclized mixture with urea in alcoholic solution at temperatures below about 130° F. thereby producing a solid complex of said linear olefins and urea, separating said solid complex from the remaining cyclized mixture and decomposing said complex to produce linear aliphatic olefins of 95+% purity.

5. The process of claim 4 in which the mixture is contacted with silica gel for a period of from 24 to 100 hours.

6. A process of separating linear aliphatic olefins from a mixture thereof with branched and cyclic mono-olefins, non-conjugated diolefins, and aromatics which comprises the steps of contacting the mixture with silica gel at a temperature of from 50 to 150° F. and for a period of from 24 to 100 hours, thereby converting at least a portion of the non-conjugated diolefins contained in the mixture to cyclized mono-olefins of the same number of carbon atoms, treating the resulting cyclized mixture with a solution comprising less than one mole of urea per mole of methanol at temperatures of from about 15 to 130° F. thereby producing a solid complex of said linear olefins and urea, separating said solid complex from the remaining cyclized mixture and decomposing said complex to produce linear aliphatic olefins of 95+% purity.

References Cited by the Examiner
UNITED STATES PATENTS 2,355,392   8/1944   Oberfell _____ 260—666
2,642,423   6/1953   Gorin _____ 260—96.5

NICHOLAS S. RIZZO, *Primary Examiner.*

HENRY R. JILES, *Examiner.*